US009253262B2

(12) United States Patent
Zhang et al.

(10) Patent No.: US 9,253,262 B2
(45) Date of Patent: Feb. 2, 2016

(54) SYSTEMS AND METHODS FOR CONNECTING MEDIA DEVICES THROUGH WEB SOCKETS

(71) Applicant: Rovi Guides, Inc., Santa Clara, CA (US)

(72) Inventors: Ping Zhang, San Jose, CA (US);
Michael Patrick Chrabaszcz, Milpitas, CA (US); Dustin James Williams, Dexter, MI (US); Frederick Hermanson, Annville, PA (US); Geoff Ehlers, Santa Rosa, CA (US)

(73) Assignee: Rovi Guides, Inc., Santa Clara, CA (US)

( * ) Notice: Subject to any disclaimer, the term of this patent is extended or adjusted under 35 U.S.C. 154(b) by 236 days.

(21) Appl. No.: 13/749,501

(22) Filed: Jan. 24, 2013

(65) Prior Publication Data

US 2014/0207957 A1    Jul. 24, 2014

(51) Int. Cl.
*H04L 29/08*    (2006.01)
*H04L 29/06*    (2006.01)

(52) U.S. Cl.
CPC .......... *H04L 67/141* (2013.01); *H04L 65/1069* (2013.01); *H04L 65/1083* (2013.01); *H04L 67/02* (2013.01); *H04L 67/16* (2013.01)

(58) Field of Classification Search
CPC .. H04L 65/1069; H04L 65/1083; H04L 67/16
USPC ................. 709/224, 213, 245, 232, 203, 226; 705/26; 707/747
See application file for complete search history.

(56) References Cited

U.S. PATENT DOCUMENTS

| 4,429,385 | A | 1/1984 | Chichelli et al. |
|---|---|---|---|
| 4,625,080 | A | 11/1986 | Scott |
| 4,706,121 | A | 11/1987 | Young |
| 4,751,578 | A | 6/1988 | Reiter |
| 4,761,684 | A | 8/1988 | Clark et al. |
| 4,787,063 | A | 11/1988 | Muguet |
| 4,908,707 | A | 3/1990 | Kinghorn |
| 5,016,273 | A | 5/1991 | Hoff |
| 5,036,314 | A | 7/1991 | Barillari et al. |
| 5,089,885 | A | 2/1992 | Clark |
| 5,113,259 | A | 5/1992 | Romesburg et al. |
| 5,132,992 | A | 7/1992 | Yurt et al. |

(Continued)

FOREIGN PATENT DOCUMENTS

| CN | 102546800 A | * 7/2012 |
|---|---|---|
| DE | 3151492 | 7/1983 |

(Continued)

OTHER PUBLICATIONS

I. Fette, IETF The websocket protocol, Dec. 2011, IETF, ISSN 2070-1721.*

(Continued)

*Primary Examiner* — Aaron Strange
(74) *Attorney, Agent, or Firm* — Ropes & Gray LLP

(57) ABSTRACT

Systems and methods are described herein for connecting client devices to applications on a server using web sockets. In one aspect, the systems and methods described provide for a routing table that may be used to direct communications between a client device and an application on a web server. The routing table may overcome challenges of implementing web sockets under current constraints of the web socket specification, the HTTP specification, and server implementations.

18 Claims, 12 Drawing Sheets

(56) References Cited

U.S. PATENT DOCUMENTS

| | | |
|---|---|---|
| 5,155,591 A | 10/1992 | Wachob |
| 5,168,353 A | 12/1992 | Walker et al. |
| 5,202,915 A | 4/1993 | Nishii |
| 5,223,924 A | 6/1993 | Strubbe et al. |
| 5,233,423 A | 8/1993 | Jernigan et al. |
| 5,253,066 A | 10/1993 | Vogel |
| 5,335,277 A | 8/1994 | Harvey et al. |
| 5,353,121 A | 10/1994 | Young et al. |
| 5,359,367 A | 10/1994 | Stockill |
| 5,382,983 A | 1/1995 | Kwoh et al. |
| 5,410,326 A | 4/1995 | Goldstein |
| 5,414,756 A | 5/1995 | Levine |
| 5,455,570 A | 10/1995 | Cook et al. |
| 5,465,113 A | 11/1995 | Gilboy |
| 5,469,206 A | 11/1995 | Strubbe et al. |
| 5,479,266 A | 12/1995 | Young et al. |
| 5,479,268 A | 12/1995 | Young et al. |
| 5,481,296 A | 1/1996 | Cragun et al. |
| 5,483,278 A | 1/1996 | Strubbe et al. |
| 5,502,504 A | 3/1996 | Marshall et al. |
| 5,509,908 A | 4/1996 | Hillstead et al. |
| 5,523,796 A | 6/1996 | Marshall et al. |
| 5,524,195 A | 6/1996 | Clanton, III et al. |
| 5,526,034 A | 6/1996 | Hoarty et al. |
| 5,528,304 A | 6/1996 | Cherrick et al. |
| 5,534,911 A | 7/1996 | Levitan |
| 5,550,576 A | 8/1996 | Klosterman |
| 5,550,863 A | 8/1996 | Yurt et al. |
| 5,559,548 A | 9/1996 | Davis et al. |
| 5,559,549 A | 9/1996 | Hendricks et al. |
| 5,559,550 A | 9/1996 | Mankovitz |
| 5,570,295 A | 10/1996 | Isenberg et al. |
| 5,572,442 A | 11/1996 | Schulhof et al. |
| 5,579,239 A | 11/1996 | Freeman et al. |
| 5,583,560 A | 12/1996 | Florin et al. |
| 5,585,838 A | 12/1996 | Lawler et al. |
| 5,585,865 A | 12/1996 | Amano et al. |
| 5,585,866 A | 12/1996 | Miller et al. |
| 5,589,892 A | 12/1996 | Knee et al. |
| 5,858,866 A | 12/1996 | Berry et al. |
| 5,592,482 A | 1/1997 | Abraham |
| 5,592,551 A | 1/1997 | Lett et al. |
| 5,594,509 A | 1/1997 | Florin et al. |
| 5,596,373 A | 1/1997 | White et al. |
| 5,600,364 A | 2/1997 | Hendricks et al. |
| 5,606,374 A | 2/1997 | Bertram |
| 5,617,526 A | 4/1997 | Oran et al. |
| 5,619,249 A | 4/1997 | Billock et al. |
| 5,621,456 A | 4/1997 | Florin et al. |
| 5,623,613 A | 4/1997 | Rowe et al. |
| 5,629,733 A | 5/1997 | Youman et al. |
| 5,630,119 A | 5/1997 | Aristides et al. |
| 5,631,995 A | 5/1997 | Weissensteiner et al. |
| 5,635,978 A | 6/1997 | Alten et al. |
| 5,635,979 A | 6/1997 | Kostreski et al. |
| 5,640,484 A | 6/1997 | Mankovitz |
| 5,654,748 A | 8/1997 | Matthews et al. |
| 5,655,214 A | 8/1997 | Mullett et al. |
| 5,657,072 A | 8/1997 | Aristides et al. |
| 5,657,414 A | 8/1997 | Lett et al. |
| 5,666,293 A | 9/1997 | Metz et al. |
| 5,675,390 A | 10/1997 | Schindler et al. |
| 5,682,206 A | 10/1997 | Wehmeyer et al. |
| 5,692,214 A | 11/1997 | Levine |
| 5,694,163 A | 12/1997 | Harrison |
| 5,699,107 A | 12/1997 | Lawler et al. |
| 5,710,601 A | 1/1998 | Marshall et al. |
| 5,710,605 A | 1/1998 | Nelson |
| 5,710,884 A | 1/1998 | Dedrick |
| 5,715,020 A | 2/1998 | Kuroiwa et al. |
| 5,734,720 A | 3/1998 | Salganicoff |
| 5,734,853 A | 3/1998 | Hendricks et al. |
| 5,734,893 A | 3/1998 | Li et al. |
| 5,742,905 A | 4/1998 | Pepe et al. |
| 5,748,191 A | 5/1998 | Rozak et al. |
| 5,748,716 A | 5/1998 | Levine |
| 5,758,257 A | 5/1998 | Herz et al. |
| 5,758,259 A | 5/1998 | Lawler |
| 5,774,664 A | 6/1998 | Hidary et al. |
| 5,774,666 A | 6/1998 | Portuesi |
| 5,781,246 A | 7/1998 | Alten et al. |
| 5,787,259 A | 7/1998 | Haroun et al. |
| 5,788,507 A | 8/1998 | Redford et al. |
| 5,790,202 A | 8/1998 | Kummer et al. |
| 5,793,964 A | 8/1998 | Rogers et al. |
| 5,798,785 A | 8/1998 | Hendricks et al. |
| 5,812,930 A | 9/1998 | Zavrel |
| 5,812,931 A | 9/1998 | Yuen |
| 5,818,441 A | 10/1998 | Throckmorton et al. |
| 5,828,420 A | 10/1998 | Marshall et al. |
| 5,844,620 A | 12/1998 | Coleman et al. |
| 5,850,218 A | 12/1998 | LaJoie et al. |
| 5,852,437 A | 12/1998 | Wugofski et al. |
| 5,867,233 A | 2/1999 | Tanaka |
| 5,867,799 A | 2/1999 | Lang et al. |
| 5,878,222 A | 3/1999 | Harrison |
| 5,880,768 A | 3/1999 | Lemmons et al. |
| 5,884,298 A | 3/1999 | Smith, II et al. |
| 5,886,732 A | 3/1999 | Humpleman |
| 5,907,323 A | 5/1999 | Lawler et al. |
| 5,914,746 A | 6/1999 | Matthews, III et al. |
| 5,917,405 A | 6/1999 | Joao |
| 5,926,624 A | 7/1999 | Katz et al. |
| 5,929,849 A | 7/1999 | Kikinis |
| 5,961,603 A | 10/1999 | Kunkel et al. |
| 5,977,964 A | 11/1999 | Williams et al. |
| 5,987,509 A | 11/1999 | Portuesi |
| 5,988,078 A | 11/1999 | Levine |
| 6,002,394 A | 12/1999 | Schein et al. |
| 6,005,565 A | 12/1999 | Legall et al. |
| 6,006,257 A | 12/1999 | Slezak |
| 6,009,153 A | 12/1999 | Houghton et al. |
| 6,012,086 A | 1/2000 | Lowell |
| 6,014,184 A | 1/2000 | Knee et al. |
| 6,025,837 A | 2/2000 | Matthews, III et al. |
| 6,058,238 A | 5/2000 | Ng et al. |
| 6,064,980 A | 5/2000 | Jacobi et al. |
| 6,075,568 A | 6/2000 | Matsuura |
| 6,097,441 A | 8/2000 | Allport |
| 6,104,334 A | 8/2000 | Allport |
| 6,130,726 A | 10/2000 | Darbee et al. |
| 6,144,702 A | 11/2000 | Yurt et al. |
| 6,160,988 A | 12/2000 | Shroyer |
| 6,169,543 B1 | 1/2001 | Wehmeyer |
| 6,177,931 B1 | 1/2001 | Alexander |
| 6,192,340 B1 | 2/2001 | Abecassis |
| 6,208,384 B1 | 3/2001 | Schultheiss |
| 6,233,734 B1 | 5/2001 | Macrae et al. |
| 6,237,049 B1 | 5/2001 | Ludtke |
| 6,239,794 B1 | 5/2001 | Yuen et al. |
| 6,240,555 B1 | 5/2001 | Shoff et al. |
| 6,263,501 B1 | 7/2001 | Schein et al. |
| 6,268,849 B1 | 7/2001 | Boyer et al. |
| 6,310,886 B1 | 10/2001 | Barton |
| 6,331,877 B1 | 12/2001 | Bennington et al. |
| 6,354,378 B1 | 3/2002 | Patel |
| 6,357,043 B1 | 3/2002 | Ellis et al. |
| 6,367,080 B1 | 4/2002 | Enomoto et al. |
| 6,388,714 B1 | 5/2002 | Schein et al. |
| 6,397,080 B1 | 5/2002 | Viktorsson et al. |
| 6,445,398 B1 | 9/2002 | Gerba et al. |
| 6,463,585 B1 | 10/2002 | Hendricks et al. |
| 6,509,908 B1 | 1/2003 | Croy et al. |
| 6,530,083 B1 | 3/2003 | Liebenow |
| 6,564,378 B1 | 5/2003 | Satterfield et al. |
| 6,597,374 B1 | 7/2003 | Baker et al. |
| 6,611,654 B1 | 8/2003 | Shteyn |
| 6,675,385 B1 | 1/2004 | Wang |
| 6,704,028 B2 | 3/2004 | Wugofski |
| 6,756,997 B1 | 6/2004 | Ward, III et al. |
| 6,760,537 B2 | 7/2004 | Mankovitz |
| 6,813,775 B1 | 11/2004 | Finseth et al. |
| 6,837,789 B2 | 1/2005 | Garahi et al. |
| 6,871,186 B1 | 3/2005 | Tuzhilin et al. |

(56) References Cited

U.S. PATENT DOCUMENTS

| | | |
|---|---|---|
| 6,925,567 B1 | 8/2005 | Hirata et al. |
| 6,927,806 B2 | 8/2005 | Chan |
| 6,950,624 B2 | 9/2005 | Kim et al. |
| 7,003,791 B2 | 2/2006 | Mizutani |
| 7,020,704 B1 | 3/2006 | Lipscomb et al. |
| 7,088,952 B1 | 8/2006 | Saito et al. |
| 7,117,518 B1 | 10/2006 | Takahashi et al. |
| 7,134,131 B1 | 11/2006 | Hendricks et al. |
| 7,165,098 B1 | 1/2007 | Boyer et al. |
| 7,194,755 B1 | 3/2007 | Nakata et al. |
| 7,328,450 B2 | 2/2008 | Macrae et al. |
| 7,421,724 B2 | 9/2008 | Klosterman |
| 7,603,430 B1 | 10/2009 | Artz et al. |
| 7,627,341 B2 | 12/2009 | Wu |
| 7,657,520 B2 | 2/2010 | Chen et al. |
| 7,761,892 B2 | 7/2010 | Ellis et al. |
| 7,913,278 B2 | 3/2011 | Ellis et al. |
| 8,006,263 B2 | 8/2011 | Ellis et al. |
| 8,046,800 B2 | 10/2011 | Daniels |
| 8,046,801 B2 | 10/2011 | Ellis et al. |
| 8,132,209 B2 | 3/2012 | Kaizu et al. |
| 8,139,581 B1* | 3/2012 | Mraz et al. ............... 370/392 |
| 8,156,235 B2* | 4/2012 | Barreto et al. ............. 709/231 |
| 8,321,394 B2* | 11/2012 | Wessling et al. ........... 707/705 |
| 8,327,403 B1 | 12/2012 | Chilvers et al. |
| 8,650,494 B1* | 2/2014 | Sampath et al. ............ 715/740 |
| 8,750,308 B2* | 6/2014 | Hu et al. ................... 370/392 |
| 8,819,249 B2* | 8/2014 | Harrison .................... 709/227 |
| 8,819,726 B2* | 8/2014 | Wetzer et al. ............... 725/32 |
| 8,880,204 B2* | 11/2014 | Frei et al. ................... 700/90 |
| 2002/0032907 A1 | 3/2002 | Daniels |
| 2002/0046401 A1 | 4/2002 | Miyazaki et al. |
| 2002/0046407 A1 | 4/2002 | Franco |
| 2002/0056087 A1 | 5/2002 | Berezowski et al. |
| 2002/0059596 A1 | 5/2002 | Sano et al. |
| 2002/0087661 A1 | 7/2002 | Matichuk et al. |
| 2002/0100044 A1 | 7/2002 | Daniels |
| 2002/0143629 A1 | 10/2002 | Mineyama et al. |
| 2002/0174424 A1 | 11/2002 | Chang et al. |
| 2002/0174430 A1 | 11/2002 | Ellis et al. |
| 2002/0194596 A1 | 12/2002 | Srivastava |
| 2003/0005445 A1 | 1/2003 | Schein et al. |
| 2003/0030751 A1 | 2/2003 | Lupulescu et al. |
| 2003/0031465 A1 | 2/2003 | Blake |
| 2003/0061302 A1 | 3/2003 | Fang |
| 2003/0079227 A1 | 4/2003 | Knowles et al. |
| 2003/0084461 A1 | 5/2003 | Hoang |
| 2003/0097227 A1 | 5/2003 | Bloch et al. |
| 2003/0110499 A1 | 6/2003 | Knudson et al. |
| 2003/0149988 A1 | 8/2003 | Ellis et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0190149 A1 | 10/2003 | Chang et al. |
| 2003/0196201 A1 | 10/2003 | Schein et al. |
| 2003/0198462 A1 | 10/2003 | Bumgardner et al. |
| 2003/0204856 A1 | 10/2003 | Buxton |
| 2003/0208756 A1 | 11/2003 | Macrae et al. |
| 2004/0031051 A1 | 2/2004 | Kim et al. |
| 2004/0103439 A1 | 5/2004 | Macrae |
| 2004/0168189 A1 | 8/2004 | Reynolds et al. |
| 2004/0261093 A1 | 12/2004 | Rebaud et al. |
| 2005/0028208 A1 | 2/2005 | Ellis et al. |
| 2005/0028218 A1 | 2/2005 | Blake |
| 2005/0033641 A1 | 2/2005 | Jha et al. |
| 2005/0120373 A1 | 6/2005 | Thomas et al. |
| 2005/0204388 A1 | 9/2005 | Knudson et al. |
| 2005/0251822 A1 | 11/2005 | Knowles et al. |
| 2005/0251827 A1 | 11/2005 | Ellis et al. |
| 2006/0031883 A1 | 2/2006 | Ellis et al. |
| 2006/0085825 A1 | 4/2006 | Istvan et al. |
| 2006/0100923 A1 | 5/2006 | Courchesne |
| 2006/0136966 A1 | 6/2006 | Folk |
| 2006/0155780 A1 | 7/2006 | Sakairi et al. |
| 2006/0184978 A1 | 8/2006 | Casey |
| 2006/0253874 A1 | 11/2006 | Stark et al. |
| 2007/0043829 A1 | 2/2007 | Dua |
| 2007/0067805 A1 | 3/2007 | Macrae |
| 2007/0188902 A1 | 8/2007 | Patron et al. |
| 2007/0204308 A1 | 8/2007 | Nicholas et al. |
| 2008/0010655 A1 | 1/2008 | Ellis et al. |
| 2008/0139193 A1 | 6/2008 | Hao et al. |
| 2008/0148320 A1 | 6/2008 | Howcroft |
| 2008/0189737 A1 | 8/2008 | Ellis |
| 2008/0189742 A1 | 8/2008 | Ellis et al. |
| 2008/0189743 A1 | 8/2008 | Ellis et al. |
| 2008/0243641 A1 | 10/2008 | Leno |
| 2008/0263587 A1 | 10/2008 | DeBie |
| 2008/0313260 A1 | 12/2008 | Sweet et al. |
| 2008/0320543 A1 | 12/2008 | Wang et al. |
| 2010/0153885 A1 | 6/2010 | Yates |
| 2010/0281107 A1* | 11/2010 | Fallows et al. ............. 709/203 |
| 2012/0110646 A1 | 5/2012 | Ajitomi et al. |
| 2012/0117145 A1 | 5/2012 | Clift et al. |
| 2012/0144416 A1 | 6/2012 | Wetzer et al. |
| 2012/0144427 A1 | 6/2012 | Lee et al. |
| 2013/0232217 A1* | 9/2013 | Kristiansson et al. ........ 709/213 |
| 2013/0290516 A1* | 10/2013 | Eaton et al. ................. 709/224 |
| 2014/0150022 A1* | 5/2014 | Oh et al. ..................... 725/37 |
| 2014/0181949 A1* | 6/2014 | Hunter ........................ 726/11 |
| 2014/0201838 A1* | 7/2014 | Varsanyi et al. ............. 726/23 |
| 2014/0297333 A1* | 10/2014 | D'Souza ..................... 705/3 |
| 2014/0330951 A1* | 11/2014 | Sukoff et al. ............... 709/223 |

FOREIGN PATENT DOCUMENTS

| | | |
|---|---|---|
| DE | 4431438 | 3/1996 |
| DE | 19502922 | 8/1996 |
| DE | 19531121 | 2/1997 |
| DE | 19740079 | 3/1999 |
| EP | 0774853 | 5/1997 |
| EP | 0793225 | 9/1997 |
| EP | 0805594 | 11/1997 |
| EP | 1271952 | 1/2003 |
| GB | 2265792 | 10/1993 |
| GB | 2275800 | 9/1994 |
| JP | 03-022770 | 1/1991 |
| JP | 08-56352 | 2/1996 |
| JP | 09-065300 | 3/1997 |
| JP | 09-102827 | 4/1997 |
| JP | 09-120686 | 5/1997 |
| JP | 09-148994 | 6/1997 |
| JP | 09-162818 | 6/1997 |
| JP | 09-270965 | 10/1997 |
| JP | 09-298677 | 11/1997 |
| JP | 11-317937 | 11/1999 |
| WO | WO 87/03766 | 6/1987 |
| WO | WO 89/03085 | 4/1989 |
| WO | WO 91/07050 | 5/1991 |
| WO | WO 94/14282 | 6/1994 |
| WO | WO 94/15284 | 7/1994 |
| WO | WO 95/01056 | 1/1995 |
| WO | WO 95/01059 | 1/1995 |
| WO | WO 95/10910 | 4/1995 |
| WO | WO 95/28055 | 10/1995 |
| WO | WO 95/32585 | 11/1995 |
| WO | WO 96/07270 | 3/1996 |
| WO | WO 96/13932 | 5/1996 |
| WO | WO 96/20555 | 7/1996 |
| WO | WO 97/12486 | 4/1997 |
| WO | WO 97/13368 | 4/1997 |
| WO | WO 97/22207 | 6/1997 |
| WO | WO 97/31480 | 8/1997 |
| WO | WO 97/33434 | 9/1997 |
| WO | WO 97/36422 | 10/1997 |
| WO | WO 97/47106 | 12/1997 |
| WO | WO 97/47143 | 12/1997 |
| WO | WO 97/49237 | 12/1997 |
| WO | WO 97/50251 | 12/1997 |
| WO | WO 98/10589 | 3/1998 |
| WO | WO 98/10598 | 3/1998 |
| WO | WO 98/16062 | 4/1998 |
| WO | WO 98/17064 | 4/1998 |

(56) References Cited

FOREIGN PATENT DOCUMENTS

| WO | WO 98/26584 | 6/1998 |
|---|---|---|
| WO | WO 98/56173 | 12/1998 |
| WO | WO 98/56176 | 12/1998 |
| WO | WO 99/04570 | 1/1999 |
| WO | WO 99/14947 | 3/1999 |
| WO | WO 99/30491 | 6/1999 |
| WO | WO 99/60783 | 11/1999 |
| WO | WO 00/79798 | 12/2000 |
| WO | WO 2005/091626 | 9/2005 |

OTHER PUBLICATIONS

Bach et al., "Multimedia TV Set, Part 1" Radio-Fernsehen Elektronik (RFE), Sep. 1996, pp. 28 31. (English language translation attached.).
Bach et al., "Multimedia TV Set, Part 2 and Conclusion," Radio-Fernsehen Elektronik (RFE), Oct. 1996, pp. 36-40. (English language translation attached.).
DiRosa "Pinochle's BIGSURF Netguide", Jul. 1995, vol. 3.1, 27 pages.
Eitz, "Zukunftige Informations-Und Datenangebote Beim Digitalen Fernsehen—EPG Und "Lesezeichen"," Rundfunktechnische Mitteilungen, vol. 41, pp. 76-72, Apr. 30, 1997.
Hirtz et al:, "Open TV: Betriebssystem Fuer Interaktives Fernsehen," Fernseh Und Kinotechnik, de vde Verlag GMBH, Berlin, vol. 50, No. 3, Mar. 1, 1996, pp. 84-89, XP 000581417, ISSN: 0015-0142 (Translation, pp. 1-9).
Honey, is there anything good on the remote tonight?, advertisement from Multichannel News, Braodband Week Section, p. 168, Nov. 30, 1998.
How Evolve Works, from the Internet at http://www.evolveproducts.com/network.html, printed on Dec. 28, 1998.
Index Systems Inc., "Gemstar Service Object Model," Data Format Specification, Ver. 2.0.4, pp. 58-59.
Jaidev, "EXSLT—A Wired and Wireless Case Study," http://csharpcomputing.com/XMLTutorial/Lession15.htm.
Jini Architecture Overview, by Jim Waldo, from the Internet at http://Java.sun.com/products/jini/whitepapers/architectureoverview.pdf/ pinted on Jan. 25, 1999. The document bears a copyright date of 1998.
Neumann, "WDR Online Aufbau Und Perspektiven Automatisierter Online-Dienste Im WDR," Rundfunktechnische Mitteilungen, vol. 41, pp. 56-66, Jun. 1997.
Papers Delivered (Part1), 61st National Conference, Information Processing Society of Japan, Oct. 3-5, 2000.
Pogue, "State of the Art: for TiVo and Replay, New Reach," N.Y. Times, May 29, 2003.
Randerson, "Let Sofware Catch the Game for You," New Scientist, Jul. 3, 2004.
Reaching your subscribers is a complex andcostly process—until now, from the Internet at http://www.evolveproducts.com/info.html, printed on Dec. 28, 1998.
Rogers, "Telcos vs. Cable TV: The Global View," Data Communications, No. 13, New York, pp. 75, 76, 78 and 80, Sep. 1995.
Sun's Next Steps in Digital Set-Tops, article in Cablevision, p. 56, Nov. 16, 1998.
The Evolve EZ Guide. The Remote. Control, from the Internet at http://www.evolveproducts.com/display2.html, printed on Dec. 28, 1998.
Using Starsight 2, published before Apr. 19, 1995.
Venditto, Prodigy for Dummies, 1995, IDG Books, pp. 57-63 and 213.
What is Jini?, from the Internet at http://java.sun.com/products/jini/whitepapers/whatsjini.pdf, printed on Jan. 25, 1999.
Why Jini Now?, from the internet at http://java.sun.com/products/jini/whitepapers/whyjininow.pdf, printed on Jan. 25, 1999. The. document bears a copyright date of 1998.

\* cited by examiner

| 1010 | 1020 | 1030 | 1040 | 1045 | 1050 | 1060 | 1065 |
|---|---|---|---|---|---|---|---|
| APP NAME | PROCESS ID | CLIENT ID | CLIENT PORT | CLIENT WEB SOCKET | LOCAL PORT | LOCAL WEB SOCKET | ROLE |
| WEBMOM | 1785 | 245.78.12.46 | 1 | 2 | 80 | 2 | BOTH |
| BGUIDE | 2154 | 17.22.45.10 | 4 | 5 | 80 | 5 | BOTH |
| BGUIDE | 3388 | 192.168.0.8 | 1000 | 7 | 80 | 7 | BOTH |
| IWATCH | 3756 | 10.78.1.2 | 1000 | 9 | 100 | 9 | RECEIVER |
| BGUIDE | 3348 | 192.168.0.8 | 80 | 11 | 105 | 11 | CONTROLLER |

SYSTEMS AND METHODS FOR CONNECTING MEDIA DEVICES THROUGH WEB SOCKETS

BACKGROUND OF THE DISCLOSURE

Media content may be accessed by a plurality of user devices connecting to a variety of sources over the Internet. Electronic media guide applications implemented on the user devices may be used to navigate the multitude of media guidance information that corresponds to the viewable media content. Client applications typically communicate with server applications using hypertext transfer protocol (HTTP). HTTP communication is deficient at least because it is half-duplex and incurs overhead from repetitive information carried in HTTP request and response messages.

SUMMARY OF THE DISCLOSURE

In view of the foregoing, systems and methods are provided for connecting client media devices to server application through web sockets to deliver media content and related information. Client applications may communicate with server applications using web socket connections to overcome the above-described deficiencies. The systems and methods described also provide embodiments to overcome constraints of the web socket specification and HTTP specification, published by the Internet Engineering Task Force (IETF), to implement web sockets that connect devices to one or more applications at a server.

In some embodiments, a routing table is used to direct communications through web sockets between a first device and an application service through a second device.

Processing circuitry of the second device receives a first message from the first device to form a web socket connection. The processing circuitry of the second device stores the identification code of the first device received in the first message, and an identification code of the web socket connection in a routing table that includes one or more application services associated with the web socket connection.

Processing circuitry of the second device receives, via the communication network, a second message from the first device for transmission to the application service. The processing circuitry of the second device retrieves the web socket connection associated with the first device and the application service from the routing table, based on the identification code of the first device received in the second message and another identification code stored in the routing table. The processing circuitry then transmits the received second message from the first device to the application service through the web socket connection.

In some implementations, the first received message is an upgrade request message to upgrade a transport connection to a web socket connection. In some implementations, the upgrade request message is a point-to-point message that includes the identification code of the first device as a source address and an identification code of the second device as a destination address. In some implementations, the upgrade request message is a broadcast message that includes the identification code of the first device as a source address and a broadcast address as the destination address.

In some implementations, the application service is implemented in a layer in a protocol stack including a plurality of layers, below an application layer and above a network layer. In some implementations, a third message is received from the first device through the web socket connection for transmission to the application service, without providing an indication message to an application implemented in the application layer above the layer in which the application service is implemented in the protocol stack.

In some implementations, processing circuitry of the second device forms a second web socket connection to a third device, and the second web socket connection is associated with the application service. The processing circuitry stores an identification code of the third device and an identification code of the second web socket connection in the routing table, which includes one or more application services associated with the second web socket connection.

The processing circuitry receives a third message from the application service for transmission to the third device. The processing circuitry retrieves the second web associated with the third device and the application service from the routing table. The processing circuitry transmits the received third message from the application service to the third device through the second web socket connection.

In some implementations, the application service is a routing service for forwarding the received second message to a second application service implemented on a third device separate from the first device and the second device.

In some implementations, the second device is a server device and the application service is maintained on the server device. In some implementations, processing circuitry of the second device forms a second web socket connection with a cloud service. The processing circuitry transmits a third message from the application service to the cloud service through the second web socket connection.

In some implementations, processing circuitry of the second device receives the second message from the application service directed to the first device, instead of from the first device directed to the application service. Processing circuitry of the second device retrieves, from the routing table, the web socket connection associated with the first device and the application service, based on the identification code of the first device in the received message and another identification code stored in the routing table. Processing circuitry of the second device transmits the received second message from the application service to the first device through the retrieved web socket.

In some implementations, the processing circuitry compares an identification code of the application service associated with the received second message and an identification code of the first device with the stored information in the routing table, and retrieves a web socket connection based on the comparison.

It should be noted that the systems and/or methods described above may be applied to, or used in accordance with, other systems, methods and/or apparatuses.

BRIEF DESCRIPTION OF THE DRAWINGS

FIG. 10 illustrates information included in a routing table used in some embodiments of the present disclosure.

DETAILED DESCRIPTION OF EMBODIMENTS

Figure 1:
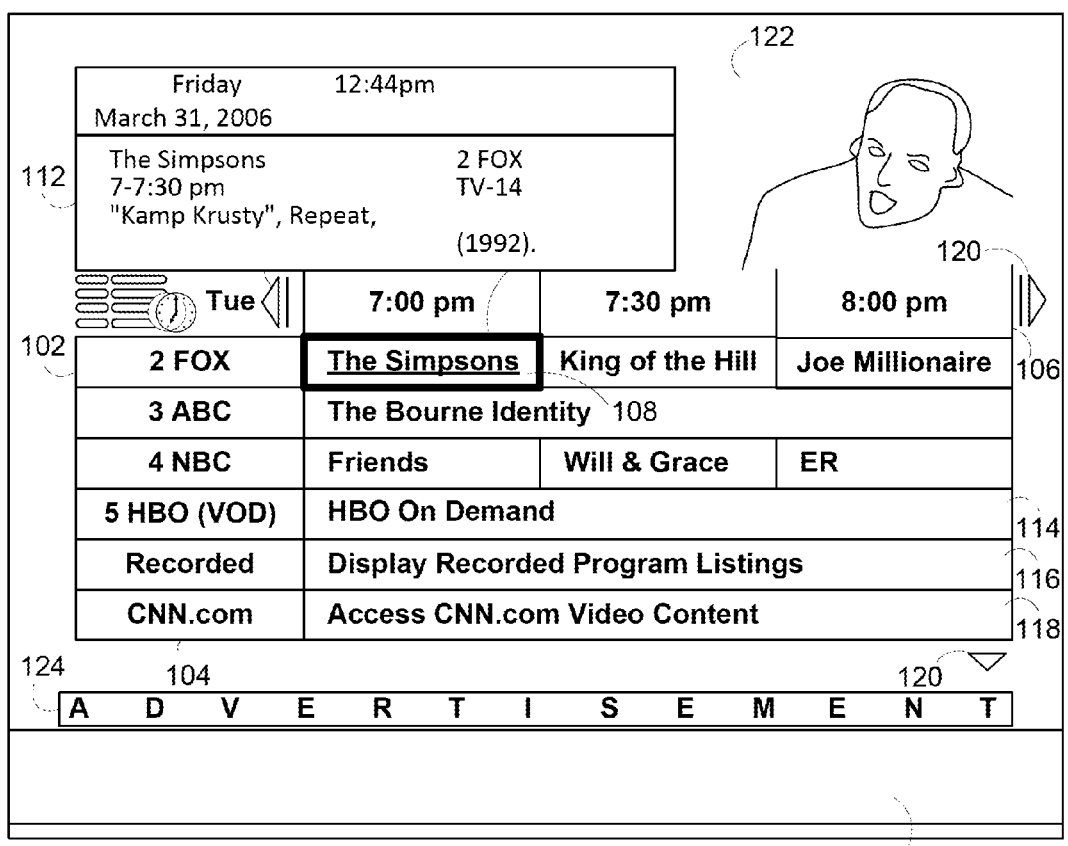
FIG. 1 shows an illustrative interactive media guidance application display screen in accordance with some embodiments of the present disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content. As referred to herein, the term "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. The various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
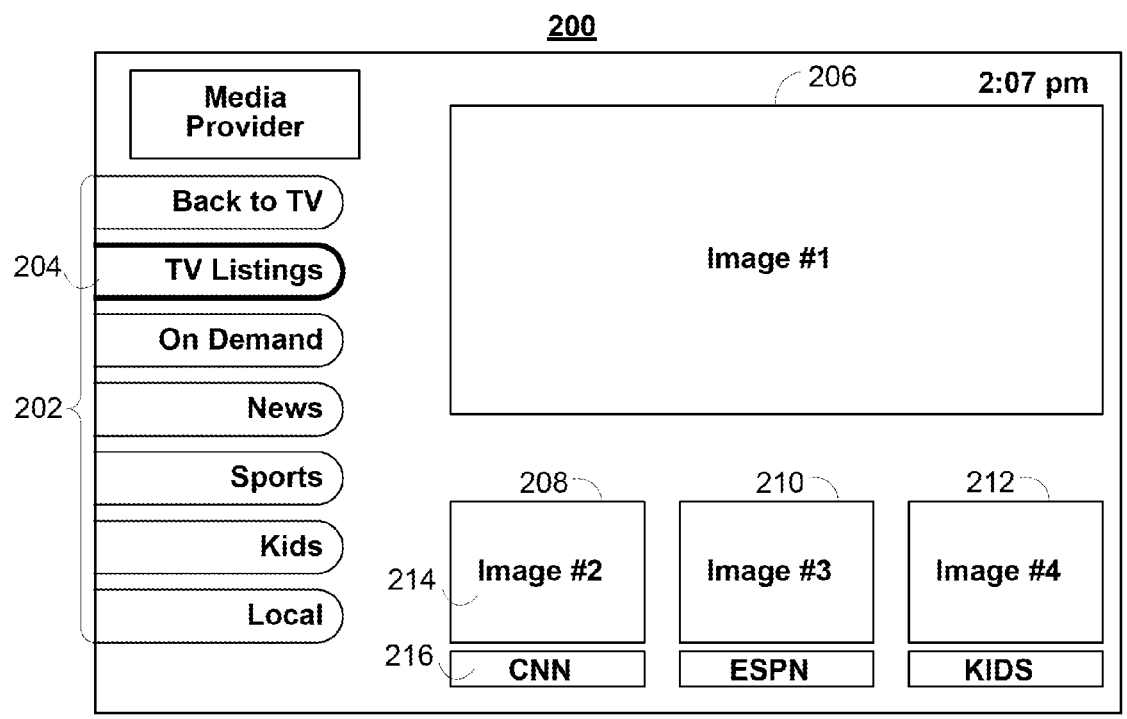
FIG. 2 shows another illustrative interactive media guidance application display screen in accordance with some embodiments of the present disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 108. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. The various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, published Jun. 17, 2010, which is hereby incorporated by reference herein in its entirety.

Figure 3:
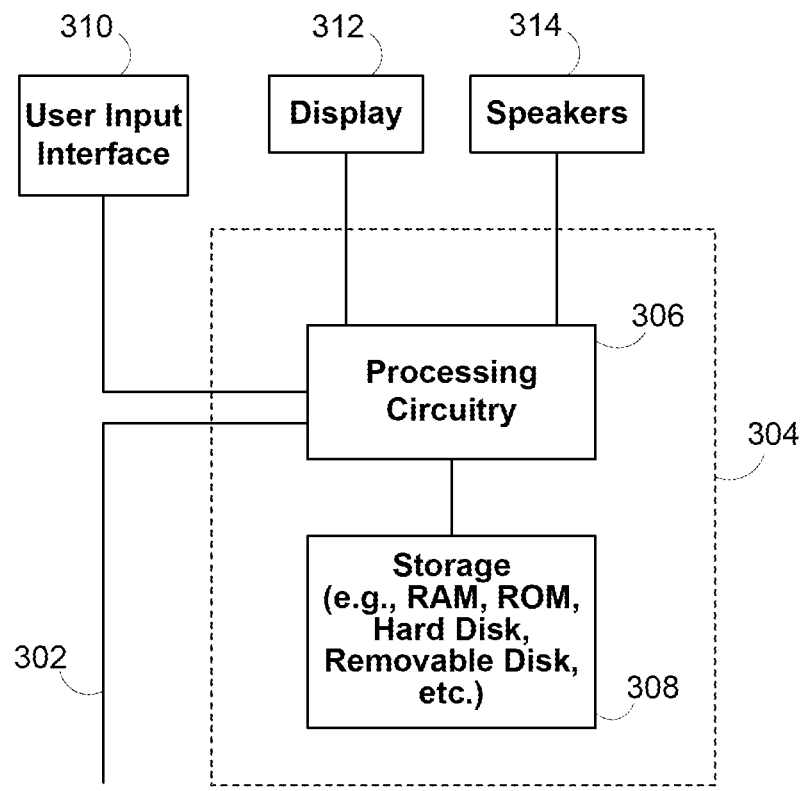
FIG. 3 illustrates an example of a user device that may provide media assets in accordance with some embodiments of the present disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308.

Content may be delivered to electronic devices over the Internet using any suitable application level protocol such as hypertext transfer protocol (HTTP) or real-time transfer protocol (RTP). HTTP is typically used for reliable delivery content, such as VOD content. RTP is typically used for real-time streaming of content, such a live broadcast. HTTP and RTP are application level protocols, and each is delivered over a transport protocol, such as transport control protocol (TCP) or user datagram protocol (UDP). TCP provides connection-oriented reliable delivery of content and is typically used to deliver HTTP content. UDP provides connectionless delivery of content with low overhead and is typically used to delivery RTP content. The transport level protocols are used to deliver information over LANs, WANs and other suitable networks using protocols such as Internet Protocol. These protocols will be discussed in further detail below in references to FIGS. 5-7.

Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308).

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR_), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders, MPEG-4 decoders, H.264 decoders, or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets webpages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
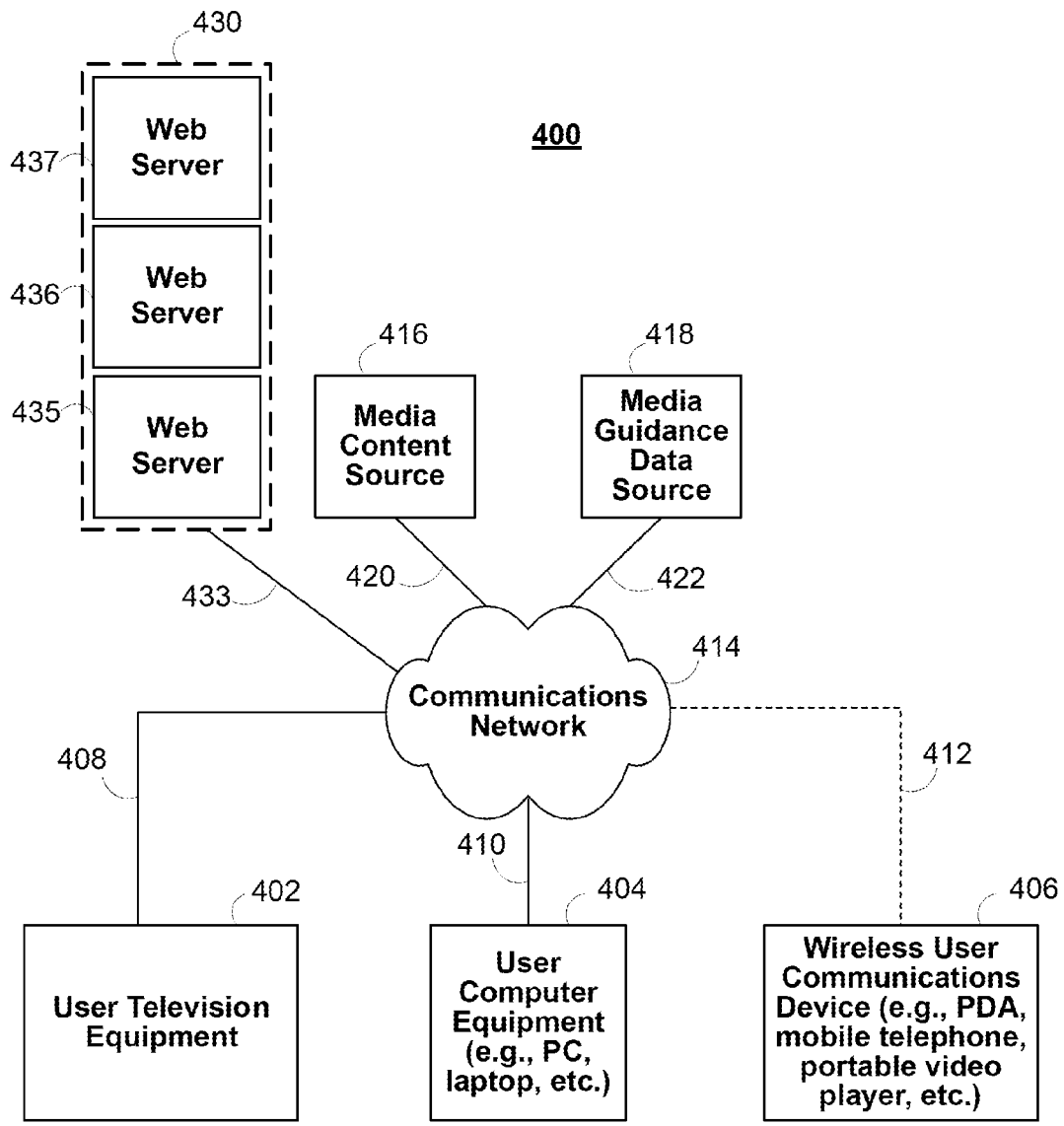
FIG. 4 illustrates an example of a system that provides media assets in accordance with some embodiments of the present disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on the various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418, and one or more web servers 430, coupled to communications network 414 via communication paths 420, 422, and 433 respectively. Paths 420, 422, and 433 may include any of the communication paths described above in connection with paths 408, 410, and 412. Communications with the content source 416 and media guidance data source 418, and one or more web servers 430 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. Several instances of web servers 435, 436 and 437 have been illustrated. (The different types of each of these sources are discussed below.) If desired, content source 416 and media guidance data source 418 may be integrated as one source device. Although communications between sources 416 and 418, and web servers 430 with user equipment devices 402, 404, and 406 are shown as through communications network 414, in some embodiments, sources 416, 418 and 430 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the ABC, INC., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

Web servers 430 may be any number of one or more web servers. For purposes of illustration and simplicity, only three web servers 435, 436 and 437, have been drawn. A web server may host a website, social network, an Internet database of information, or any other suitable online application service. A web server may be any suitable computer equipment device as described above in reference to FIG. 3. In some embodiments, a web server may act as a media content source, for example, streaming video websites, or as a media guidance data source, for example, a movie review website. In some embodiments, web servers 435-437 may be unrelated. In FIG. 4, the web servers 435-437 have been grouped together as web servers 430 for illustrative purposes. In some embodiments, user computer equipment 404 may communicate with a web server through a type of connection called a web socket. As discussed further below in reference to FIG. 8, a web socket offers advantages of full-duplex transfer of information and low overhead in connections.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. In some embodiments, media guidance applications may be client-server applications where only the client resides on the user equipment device. For example, media guidance applications may be implemented partially as a client application on control circuitry 304 of user equipment device 300 and partially on a remote server as a server application (e.g., media guidance data source 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Figure 5:
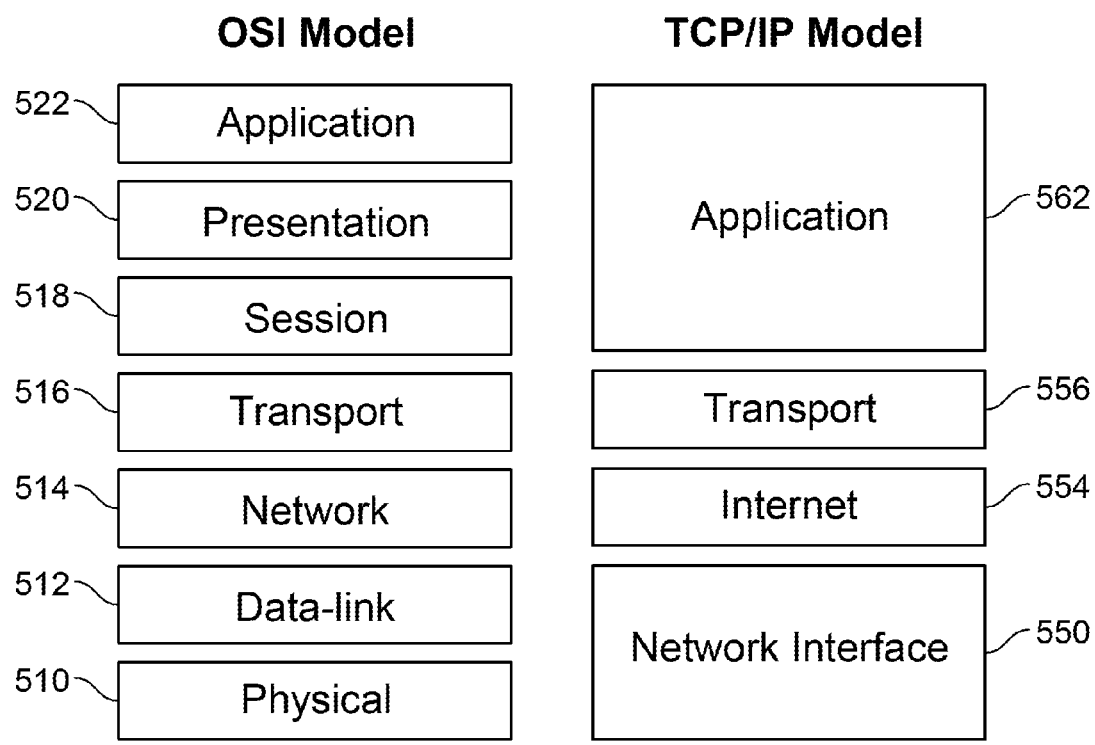
FIG. 5 illustrates the OSI layer model and TCP/IP layer model that describe the hierarchy of protocols used in communication networks in some embodiments of the present disclosure.

FIG. 5 illustrates the OSI (Open Systems Interconnection) and TCP/IP (Transport Communication Protocol/Internet Protocol) models as layered models that describe the hierarchy of protocols used in communication networks in some embodiments of the present disclosure. Each model categorizes a network communication process into a series of hierarchical layers. For example, the OSI model includes seven layers and the TCP/IP model includes four layers. Each hierarchy of layers may be collectively referred to as a protocol stack. Each layer in the stack implements a communications protocol, provides services to a higher layer and calls upon a lower layer to use services provided by the lower layer. As referred to herein, the term "layer" should be understood to be an implementation of a communications protocol that may be based in software or hardware. These models describe communication that can take place between devices described above in reference to FIG. 3 and FIG. 4, across a network 414.

The OSI model categorizes a network communication process into seven hierarchical layers: physical layer 510, data link layer 512, network layer 514, transport layer 516, session layer 518, presentation layer 520, and application layer 522. Physical layer 510 is the lowest layer and controls communications of signals across a physical medium, such as a cable or wireless medium. Data link layer 512 provides functions that connect different communicating devices and correct for errors that may occur during transmission and receipt of information on the communications medium. Network layer 514 provides functions that connect individual devices and networks of devices. This contrasts with the data link layer 512 which typically connects pairs of devices within a network.

Transport layer 516 provides services for end-to-end connection between higher layer applications residing on electronic devices. Session layer 518 creates, manages and terminates end-to-end communication sessions that exist between electronic devices in a network. Presentation layer 520 provides services to transform information received from higher layer applications to the lower layers. For example, a presentation layer may convert data encoded in ASCII into raw binary data. Application layer 522 interfaces directly with software applications that may interact with a user. For example, an Internet browser that communicates HTTP requests with a web server may be implemented at the application layer. The OSI model is described in further detail in reference document ISO-7498-1, which is hereby incorporated herein by reference in its entirety.

The TCP/IP model is an alternate model for describing a communication process in a network, and categorizes the communication process into four layers: network interface layer 550, Internet layer 554, transport layer 556 and application layer 562. Each of these layers in the TCP/IP model can be correlated to counterpart layers or counterpart groups of layers in the OSI model that serve similar roles and functions. For example, network interface layer 550 in the TCP/IP model corresponds to the group of physical layer 510 and data link layer 512 in the OSI model. Internet layer 554 of the TCP/IP model corresponds to network layer 514 of the OSI model. Transport layer 556 of the TCP/IP model corresponds to transport layer 516 of the OSI model. Application layer 562 of the TCP/IP model corresponds to the group of session layer 518, presentation layer 520 and application layer 522 in the OSI model. The TCP/IP model is further described in reference document RFC 1122 which is hereby incorporated herein in its entirety.

In the TCP/IP model, the network interface layer interfaces with the physical communications medium and may implement protocols such as LTE, ETSI GSM, CDMA2000, 802.11-WLAN, 802.3 Ethernet, or any other suitable protocol. The Internet layer provides services to interconnect user devices in a local area network or wide area network. The Internet layer may implement protocols such as Internet Protocol Version 4 (IPv4), Internet Protocol Version 6 (IPv6), or any other suitable protocols. IPv4 is described in reference document RFC 791, and IPv6 is described in reference document RFC 2460, which are hereby incorporated by reference herein in their entirety.

The transport layer is used to set-up end-to-end communications between user devices. Examples of transport protocols include transport control protocol (TCP) and user datagram protocol (UDP). TCP is described in reference document RFC 793, and UDP is described in reference document RFC 768, which are hereby incorporated herein in their entirety. The application layer is used to communication information between applications at a client device and server device. End-to-end connections in the transport layer are specified by a socket. Each user device may implement one or more transport layer sockets, by which it may communicate with another one or more devices. A socket is defined by a port number and an Internet protocol (IP) address. The pair of a local socket on a first device and remote socket on a second device forms a connection. A first device and second device can communicate information across this socket. In some embodiments, a socket at a first device may be associated with a plurality of remote sockets at other user devices. For example, a first socket at a first device may be associated with a plurality of sockets at second device. Each socket at the second device may be associated with an application at the second device. For example, a first socket at a first device may be associated with a plurality of sockets, each of the plurality associated with a different user device.

The application layer implements communications protocols such as HTTP, RTP, and file transfer protocol (FTP). HTTP is described in reference document RFC 2615 which is hereby incorporated by reference herein in its entirety. Functions that provide the services of each layer described above may be executed by control circuitry on a user device. It should be understood that the protocol models described above are exemplary. Any other suitable layered model may be used in lieu of the above described models.

Figure 6:
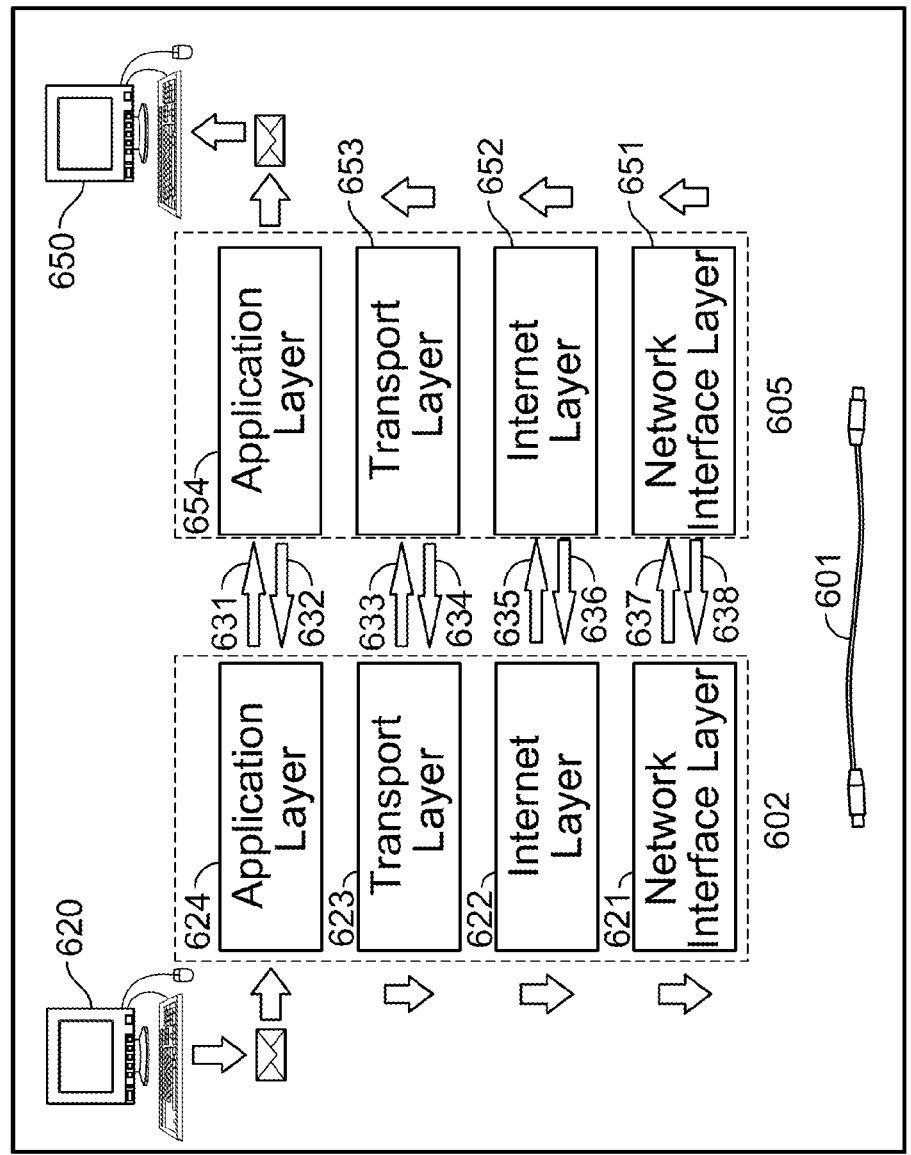
FIG. 6 illustrates how messages are communicated between electronic devices in the context of a layered model of protocols in some embodiments of the present disclosure.
Figure 7:
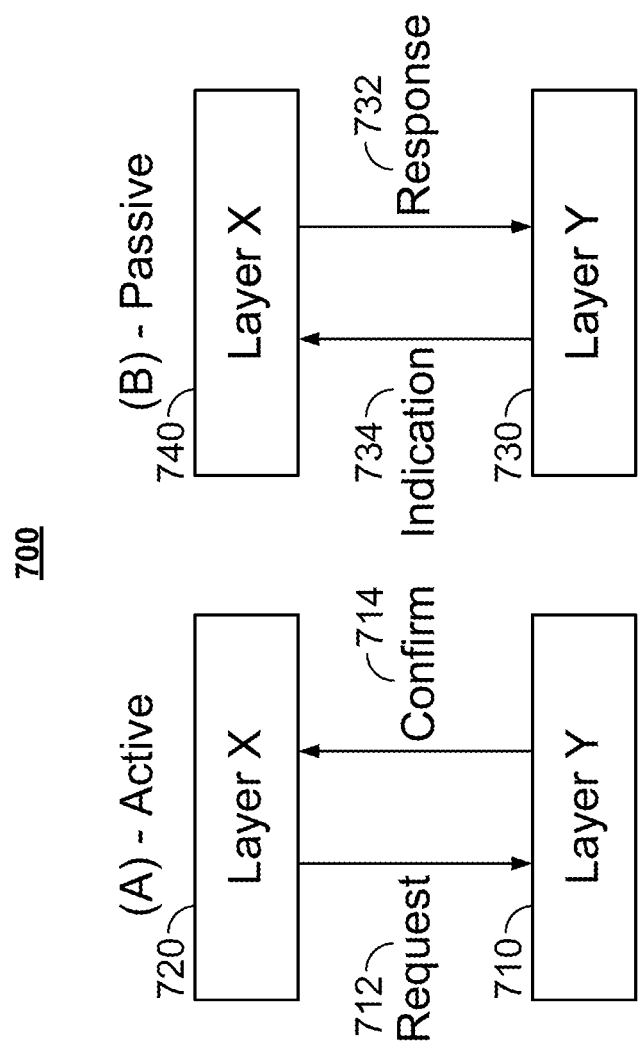
FIGS. 7A and 7B illustrate how messages are communicated between different layers in a layered model of communication protocols in some embodiments of the present disclosure.

FIG. 6 illustrates how messages are communicated between electronic devices in the context of a layered model of protocols in some embodiments of the present disclosure. Each communicating device implements a separate protocol stack, like the one described above in reference to FIG. 5. For example, user device 620 implements a first protocol stack 602 and user device 650 implements a second protocol stack 605. The communication of a message is illustrated in context of the TCP/IP model.

When a first application at a first user device 620 transmits a message to a second application at a second user device 650, a message is passed down through the first protocol stack 602 from application layer 624 to transport layer 623 to Internet layer 622 to network access layer 621. The message is delivered from the first user device 620 to the second user device 650 across a communications medium 601. At the second user device, the message is received from the communications medium 601 through the second protocol stack 605 in reverse order. The message is passed up from network access layer 621 to Internet layer 622 to transport layer 623 to application layer 624. When passing messages down the protocol stack, protocol headers are appended by each layer. When passing messages up the protocol stack, protocol headers are processed and removed by each layer.

In some embodiments, the communication of messages between the first user device and second user device may be understood as the transmission of a message from a protocol layer in the first protocol stack to a corresponding protocol layer in the second protocol stack. For example, a web browser application at the first application layer 624 may transmit an HTTP request as message 631 to a web server application at the second application layer. In response, the web browser application at application layer 624 may receive a response message 632 from the web server application at application layer 654. Likewise, each layer in the first protocol stack may be understood to communicate messages with a corresponding message with a layer in the second protocol stack. For example, first transport layer 623 may send a transport protocol message 633 to second transport layer 653, and receive a transport protocol message 634 from second transport layer 653. First Internet layer 622 may send an Internet protocol message 635 to second Internet layer 652, and receive an Internet protocol message 636 from second Internet layer 652. First network interface layer 621 may send a network interface protocol message 637 to second network interface layer 651 and receive a network interface protocol message 638 from second network interface layer 651.

Messages transmitted between corresponding layers of a protocol stack typically follow standardized formats. For example, a TCP transport message follows a format described in RFC 793 that includes a source port and a destination port. The source port identifies a port at the sending device, and the destination port identifies a port at the receiving device. For example, an IP datagram message follows a format described in RFC 791 that includes a source address and a destination address. The source address identifies a sending device, and the destination address identifies a receiving device. In some embodiments, there exist broadcast addresses or equivalents at each layer of the protocol stack. The broadcast addresses indicate that a message should be transmitted to all devices on a network. For example, the broadcast address at the IP Internet layer may be 255.255.255.255.

Although communications between the first device 620 and second device 650 may be understood as communicated across corresponding layers, any message transmitted from a first layer in the first protocol stack to a second layer in the second protocol stack must be communicated through the lower layers of the protocol stacks. For example, as discussed above, a message transmitted from the first application layer 624 to a second application layer 654 must be transmitted down through the lower layers of the first protocol stack 602, and up through the lower layers of the second protocol stack 605 to reach the second application layer 654.

In some embodiments, a first protocol layer in the first protocol stack 602 may communicate with a second protocol layer in the second protocol stack 605 that is not the counterpart layer. For example, the first application layer 624 may communicate with the second transport layer 653, without communicating with the counterpart second application layer 654. Details will be discussed further below in reference to FIGS. 7A, 7B and 8.

FIGS. 7A and 7B illustrate how messages are communicated between different layers in a layered model of communication protocols in some embodiments of the present disclosure. In some embodiments, messages may be communicated between layers in pairs. FIG. 7A illustrates an active form of message passing in which an upper layer sends a request message to a lower layer to request a service from the lower. For example, a request message 712 may be sent by layer 720 to a lower layer 710. A confirmation 714 message may be received by layer 720 from the lower layer 710. The confirmation message 714 may be provided by the lower layer 710 when it has information to send to the upper layer 720 that is associated with the request message 712. For example, when a web browser requests a web page, an application layer may pass an HTTP request message to a transport layer in order to deliver the HTTP request to a web server application on a server device. In response to receiving the request message, the transport layer may return a confirmation message to the application layer acknowledging receipt of the request. In reference to FIG. 6, a layer 720, such as first application layer 624, may send a request 712, such as an HTTP request, to a lower layer 710, such as transport layer 623, to retrieve a web page. The transport layer 623 may send a confirmation message 714, confirming receipt of the request. The transport layer may then pass the message down the protocol stack 602 of a sending device 620, to a receiving device 650 where the message is passed up the protocol stack 605 to the corresponding web server application at the application layer 654 to retrieve the web page, as discussed above in FIG. 6. In some embodiments, a request message may be passed from an upper layer to a lower layer without receiving a confirmation message.

FIG. 7B illustrates a passive form of message passing in which a layer listens for messages from a lower layer. For example, layer 740 may receive an indication message 734 from a lower layer 730. The upper layer 740 may process information received in the indication message 734 and provide a response message 732 to the lower layer 730. In some embodiments, the indication message from the lower layer may be sent responsive to an earlier request message received from the upper layer. In reference to the example discussed above in FIGS. 6 and 7A, after an application layer 624 passes an HTTP request to the transport layer 623, it may subsequently receive an indication message from the transport layer when the web page data has been received from the web server application. For example, a layer 740, such as first application layer 624, may receive an indication message 734, from a lower layer 730, such as first transport layer 623, indicating that a message containing the requested web page has been received from the web server application at application layer 654 on the second device 605. Upon receiving this indication 734, layer 740 may send a response message 732 to layer 730 acknowledging receipt of the indication message 734.

In some embodiments, the process shown in FIG. 7B differs from FIG. 7A in that information may be received by a device without an initial request message. For example, a web server application residing at layer 740 on a server device 605 may receive an indication message 734 from a transport service residing at layer 730 indicating that a client device 602 is requesting information from a webpage hosted on the server. In some implementations, the web server application at layer 740 may pass a response message 732 to the transport service residing at layer 730 to acknowledge receipt of the indication.

In some implementations, the web server application at layer 740 may provide HTML and image data in a response message 732 to the transport service residing at layer 730 to transmit to the client device 602. In some embodiments, indication messages may be passed from a lower layer to an upper layer without receiving a response message from the upper layer.

Figure 8:
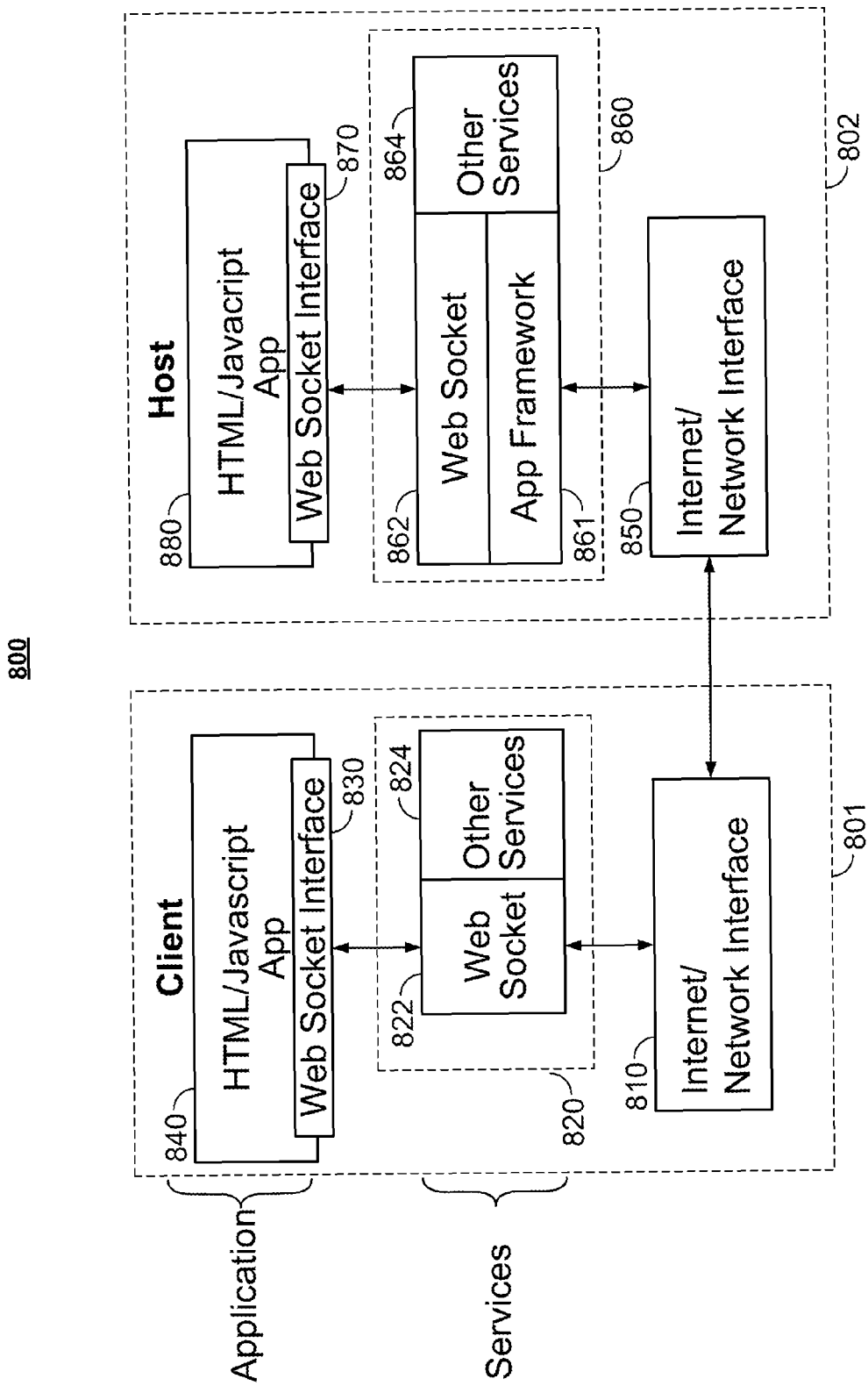
FIG. 8 illustrates an implementation of a layered model of communications that uses web sockets in some embodiments of the present disclosure.

FIG. 8 illustrates an implementation of a layered model of communications that uses web sockets in some embodiments of the present disclosure. FIG. 8 illustrates two protocol stacks, one corresponding to a client device 801 and one corresponding to a host device 802. For purposes of discussion, the term device and protocol stack may be used interchangeably to refer to a device implementing a protocol stack. For simplicity, the Internet layer 554 and network interface layer 550 shown in FIG. 5 are represented by a single layer in FIG. 8, indicated by layer 810 at the client and layer 850 at the host.

The functions of the application layer 562 and transport layer 556 illustrated in FIG. 5 are distributed between the services layer corresponding to a set of services (820, 860) and application layer corresponding to applications (840, 880). Each set of services (820, 860) includes at least a web socket service (822, 862) and may include other services (824, 864), for example a database service. In some sets of services, there exists an application framework 861 that can provide services to application 860 at an application layer 880 located above. The applications (840, 880) interfaces with the web socket services (822, 862) through respective web socket interfaces (830, 870). The use of web sockets is described in further detail below.

A web socket connection improves the data flow between a client application and a host application compared to conventional HTTP communication. In order to communicate using a web socket, control circuitry of an electronic device (801, 802) may connect an application at an application layer (840, 880) with a web socket service (822, 862) through a web socket interface (830, 870). The control circuitry discussed may be implemented as control circuitry 304 described above in reference to FIG. 3.

In the context of the TCP/IP model illustrated in FIG. 5, the web socket service resides between the application layer 562 and transport layer 556. The web socket communication improves upon HTTP communication at least by providing full duplex communication to applications, reducing overhead and maintaining underlying TCP transport connections. First, unlike communication through HTTP which is half-duplex and alternately transmitted or received between a client device and server device, communication through web sockets is full-duplex, and can be transmitted and received simultaneously. Second, when communicating through a web socket, less header information is transmitted per message, reducing overhead in transmission. Third, web sockets maintain an underlying TCP transport connection between a first device and second device without exchanging of HTTP request and response messages to poll the second device from the first device. Web sockets are described in greater detail in reference document RFC 6455, which is hereby incorporated herein in its entirety.

A web socket connection is built on top of an existing TCP transport connection between two devices. Accordingly, a TCP transport connection must first be established between two devices in order to use a web socket connection. To form a TCP transport connection, a three way handshake is performed between a server device and client device. A TCP request message, called a SYN message, is received at a server device from a client device. In response, the server device transmits a TCP response message, called a SYN-ACK message to the client device. Subsequently, the server device receives a TCP message, called an ACK message, from the client device, completing the formation of the TCP transport connection. As discussed above in reference to FIG. 5, a TCP transport connection can be described by a pair of a local TCP socket and remote TCP socket, where each TCP socket is described by at least a port number and an identifier, such as an IP address.

The TCP transport connection may be upgraded to a web socket connection using a two way handshake. A web socket upgrade request is received at a server device from a client device. In response, the server device transmits a web socket upgrade response message to the client device, and completes the upgrade of the TCP socket connection into a web socket connection. Upon completing the upgrade to the web socket connection, an application 840 at a client device may communicate with an application 880 at a server device through the web socket connection. Like the TCP transport connection, the web socket connection may be described by a pair of a local web socket and remote web socket, where each web socket is described by at least a TCP socket and an identifier of an application, an application service, or an instance of an application or application service called a process. For example, an application may be identified by an application name, an application service may be identified by an application service name, and a process may be identified by a process ID number.

In some embodiments, an application 840 residing on the client device can access information from an application 880 residing on the host device. For example, a web browser or electronic program guide operating at the client device may access program listings information from a host application 880 operating at an application layer on a host device, through an Internet connection.

In some embodiments, an application 840 at an application layer on a client device can access an application framework 861 from a set of services 860 in the services layer in a host device. In some implementations, the client application 840 at the application layer can access information from the application framework 861 in the services layer without coupling to a corresponding application 880 in the application layer on the host device. Such an implementation may be advantageous because fewer messages need to be exchanged between layers resulting in lower overhead. For example, in reference to FIG. 8, an application 840 at client device 801 can communicate use services of the application framework 861 at the services layer in the server device 802, without communicating with the corresponding application 880 at the application layer.

It should be understood that the embodiments illustrated in FIG. 8 are merely representative and not limiting. The order of the layers, and the sub-layers in the services layer, may be re-arranged. In some embodiments, there is no web socket interface. In some embodiments, the application framework 861 is located between the application layer 880 and the web socket service 862, below the web socket service 862 instead of above it. In some implementations, the application framework sits at the same level as the web socket service, similar to how web socket service 822 and other services 824 are located at the same level.

Figure 9:
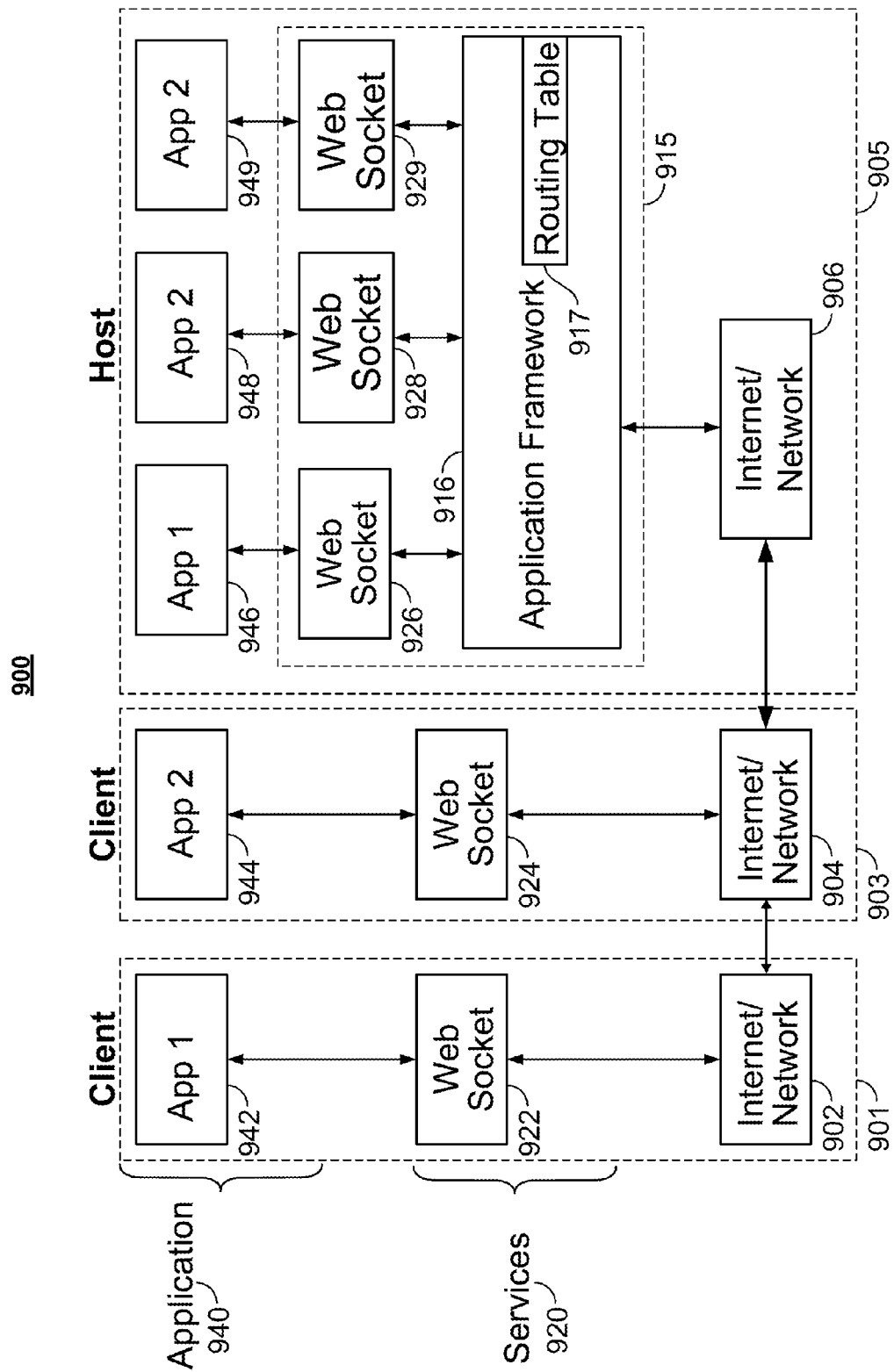
FIG. 9 illustrates an implementation of a layered model of communications that uses web sockets and a routing table in some embodiments of the present disclosure.

FIG. 9 illustrates an implementation of a layered model of communications that uses web sockets and a routing table in some embodiments of the present disclosure. FIG. 9 illustrates three protocol stacks, a first protocol stack for a first client device 901, a second protocol stack for a second client device 903, and a third protocol stack for a host device 905. For the purposes of brevity, the Internet layer 554 and network interface layer 550 are indicated by single a layer 902, 904, 906 for each of the three protocol stacks 901, 903, and 905. The functions of application layer 562 and transport layer 556 are distributed among application layer 940 and services layer 920.

The protocol stack 901 for the first client device includes a first application layer 942, a first web socket service 922, and a first Internet/network interface layer 902. The protocol stack 903 for the second client device includes a second application layer 944, a second web socket service 924, and a second Internet/network interface layer 904. The protocol stack 905 for the host device includes a third application layer 946, a third web socket service 924, a fourth application layer 948, a fourth web socket service 928, a fifth application 949, a fifth web socket service 929, an application framework 916, and a third Internet/network interface layer 906. The application framework may include a routing table 917.

FIG. 9 differs from FIG. 8 in that the host device 905 includes multiple applications, 946, 948 and 949, that may be in communication with one or more client devices, 901 or 902. In some embodiments, as illustrated in FIG. 9, each application may be mapped to a distinct web socket service. For example, application 946 to web socket service 926 and application 948 may be mapped to web socket service 928. In some implementations, each web socket service may be mapped to a different distinct TCP socket.

In some implementations, each web socket service may be mapped to the same TCP socket. For example, web socket service 926 and web socket service 928 may be mapped to the same TCP socket. Several challenges to such an implementation exist, and will be discussed further below. The Internet Assigned Numbers Authority (IANA) has assigned incoming HTTP traffic received by a server to TCP port 80. The web socket specification, RFC 6455, creates web sockets by upgrading a TCP transport connection using HTTP messages. Accordingly, under these two constraints, web sockets at a host may only be created on a single TCP port, in this case TCP port number 80. Furthermore, in some implementations of operating systems, only one application or service may be bound to a particular TCP port. Because all web sockets at a host can be created only on a single port, and only one application may be bound to a particular port, then all web socket connections may interact with only one host application bound to the single port. These limitations would restrict the utility of web sockets, because all web socket connections, regardless of the originating client device, would only communicate with one host application.

To circumvent these limitations, a routing table 917 may be used. The routing table may be used to route incoming messages received from the same TCP port to one or more different applications. Details of the routing table will be discussed further below in reference to FIG. 10.

FIG. 10 illustrates information included in a routing table 1000 used in some embodiments of the present disclosure. The routing table may include various fields such as application name 1010, process identification number 1020, client ID 1030, client port number 1040, client web socket ID 1045, local port number 1050, local web socket ID 1060 and role information 1065. The role information 1065 may be registered by an application or process in the application framework 916. A role may include acting as a receiver (passive listener for messages), controller (active commander for sending messages), or acting as both a receiver and controller. In some embodiments, an application may have a specified role and associated instances of the application, such as a process, may have the same specified role. For example, the application may be a listener, and associated instances of the application are listeners. In some embodiments, two instances of the same application, such as two different processes, may have different roles. For example, a first instance of an application may be a listener, and a second instance of the application may be a controller.

Illustrated in FIG. 10 are five processes of three applications described in rows 1070, 1080, 1090, 1095, and 1097. For example, in reference to FIG. 9 above, a first client device 901 may send an HTTP request to host device 905 to connect to a first application 946 through TCP port 80 on the host device. In response to receiving the request, the application framework 916 may create a first web socket 926 to connect client device 901 to application 946 through TCP port 80. The application framework 916 on host device 905 may store the application name and process ID corresponding to the application 946, web socket ID corresponding to web socket 926 at host device 905, the host port number, the client ID and client port number of the client device 901, and the role of application 948, in routing table 1000 as entry 1070. For example, the application may be a parental control application, WEBMOM, that acts as both a receiver and controller. The application may receive remote commands from a client device, corresponding to client ID 245.78.12.46, to block certain programs from display. The application may send messages to user equipment to implement the blocking of programs, or may send status information to the client device.

A second client device 903 may send an HTTP request to host device 905 to connect to a second application 948 through TCP port 80 on the host device. In response to receiving the request, the application framework 916 may create a second web socket 928 to connect client device 903 to application 948 through TCP port 80. The application framework 916 on host device 905 may store the application name and process ID corresponding to the application 948, web socket ID corresponding to web socket 968, the host port number, and the client ID and client port number of the client device 903 in routing table 1000 as entry 1080. In this way, multiple applications can communicate on separate web sockets on the same TCP port.

For example, if a message is received at host device 905 from client device 901 communicating on web socket 926, application framework 916 at host 905 may receive the message, and compare the web socket ID of the received message with the routing table to look up the corresponding application and redirect the received message through web socket service 926 to application 946. For example, the application may be a media guidance application, B-Guide, that acts as both a receiver and a controller. The application may receive remote commands from a client device, corresponding to client ID 17.22.45.10, to record certain programs. The application may send messages to user equipment to implement the recording of programs, or may send status information to the client device.

In some embodiments, an application framework 916 may create instances of an application having a unique process ID, in response to receiving a request from a client device to connect to a service in the application framework. For example, in reference to FIG. 9 discussed above, a first client device 901 may send a request to connect to a service in application framework 916. In response to receiving the request, the service may create a process represented as application process 948, and a web socket 928, to connect client device 901 to application 948. Control circuitry 304 of the host device 905 running the application framework 916 may store the application name and process ID corresponding to the application 948, the web socket ID corresponding to web socket 928, the host port number, the client ID and client port number of the client device 901, and the role of application process 948 in routing table 1000 as entry 1090 on a storage 308.

For example, the instance may be a process of a media guidance application, B-Guide, that acts as both a receiver and a controller. The application may receive remote commands from a client device, corresponding to client ID 192.168.0.8, to record certain programs. The application may send messages to user equipment to implement the recording of programs, or may send status information to the client device.

In some embodiments, a second client device 903 may send a request to host device 905 to connect to the same service in application framework 916. In response to receiving the request, the service may create a separate process as application 949, and a web socket 929, to connect client device 903 to application 949. Control circuitry 304 running the application framework 916 on host device 905 may store the application name and process ID corresponding to application 949, web socket ID corresponding to web socket 929, the host port number, and the client ID and client port number of the client device 901 in routing table 1000 as entry 1095_on storage 308.

For example, the application may be a monitoring program, IWATCH, that acts as a receiver. The application may receive messages from a client device, corresponding to client ID 10.78.1.2, indicating selections of media content by a user of the client device. Control circuitry 304 of the host device running the application may update a profile for the user stored on the host device, based on the received information.

In some embodiments, the application framework may upgrade a TCP connection received at the host device on a port other than the standard HTTP port 80, and subsequently upgrade the TCP connection to a web socket connection. For example, in reference to FIG. 9 discussed above, a second client device 903 may send a request to host device 905 to connect to a service in application framework 916. In response to receiving the request, the host device 905 running the service may create a process represented as application process 949, and a web socket 929, based on the TCP socket at port 100 to connect client device 903 to application 949. Control circuitry 304 of the host device running the application framework 916 may store the application name and process ID corresponding to application 949, web socket ID corresponding to web socket 929, the host port number, and the client ID and client port number of the client device 901 in routing table 1000 as entry 1095 on storage 308.

In some embodiments, the routing table described in FIG. 10 may be used to select a client device for communication. In reference to the example discussed above, a service creates a separate process for each connection to a client device. When control circuitry of host device 905 under the direction of a process such as application process 948 transmits a message to the client device 901, control circuitry passes the message, which at least includes the process ID and web socket number, to the application framework 916. Under direction of application framework 916, the control circuitry looks up the client address and client port number from the routing table 1000. Using this information, the control circuitry, under direction of the application framework, passes a request to the lower Internet layer to transmit the message received from the application 948 to the client device 901.

For example, the application may be a media guidance application, B-Guide, that acts as a controller. Control circuitry 304 of a host device running the application may create an instance of the application to send messages to a user equipment, having client ID 192.168.0.8, to record a program. The control circuitry of the host device may establish a web socket connection to the user equipment, based on a TCP connection to port 80 of the user equipment. Information about the connection may be stored in routing table 1000 as entry 1097. When control circuitry 304 of the host device running application 948 subsequently sends messages to the user equipment, it may look up the web socket connection in routing table 1000.

In some embodiments, an application at a host device may use the routing table to communicate a message to a second client device, in response to receiving a communication from a first client device. For example, a first client device 901 and a second client device 903 may be connected to the same application at a host device by two separate web socket connections. For example, the first client device may be a first client electronic program guide application on a first tablet device. The host device may be a web-enabled set-top box. A second client device may be a television connected to the set-top box. The first tablet device may be used to control the viewing of a program on the television. The communications are routed through the set-top box host device. A third client device, such as another tablet device, may also be coupled to the host set-top box device through a web socket. In response to receiving a selection of a program from the first client device, the host set-top box device may transmit a notification to the third client device. This notification enables monitoring and use of the host device, for example for parental control purposes.

In some embodiments, the routing table may be used to redirect a message from a client device to another host device. For example, application framework 916 at a first host device may receive a message from client device 901. Based on the contents of the received message and requested application service, the first host device may send the message to a second host device. The first host device may act as a router, providing information received from the application service at the second host device, to the client device 901. The connection between the client device and first host device, and first host device and second host device may be a web socket connection. For example, the client device may first form a web socket connection with the first host device, and then the first host device may form a web socket connection with the second host device.

In some embodiments, the routing table may be used to redirect a message from a client device to another a cloud service. For example, in reference to the example discussed above, in the previous paragraph, the client device 901 may send a request message to connect to a cloud service from a first host device. The first host device may determine a second host device that acts as a gateway to the cloud service. The client device may form a first web socket connection with the first host device, and the first host device may form a second web socket connection with the second host device. Information from the cloud service may be exchanged with the client device by the second host device via the first host device through the first and second web socket connections.

In some embodiments, each application may be mapped to the same web socket and the web socket may be mapped to the same TCP socket. In such embodiments, a routing table similar to the one described with reference to FIG. 10 above may be used to route messages from different applications to the same web socket.

Figure 11A:
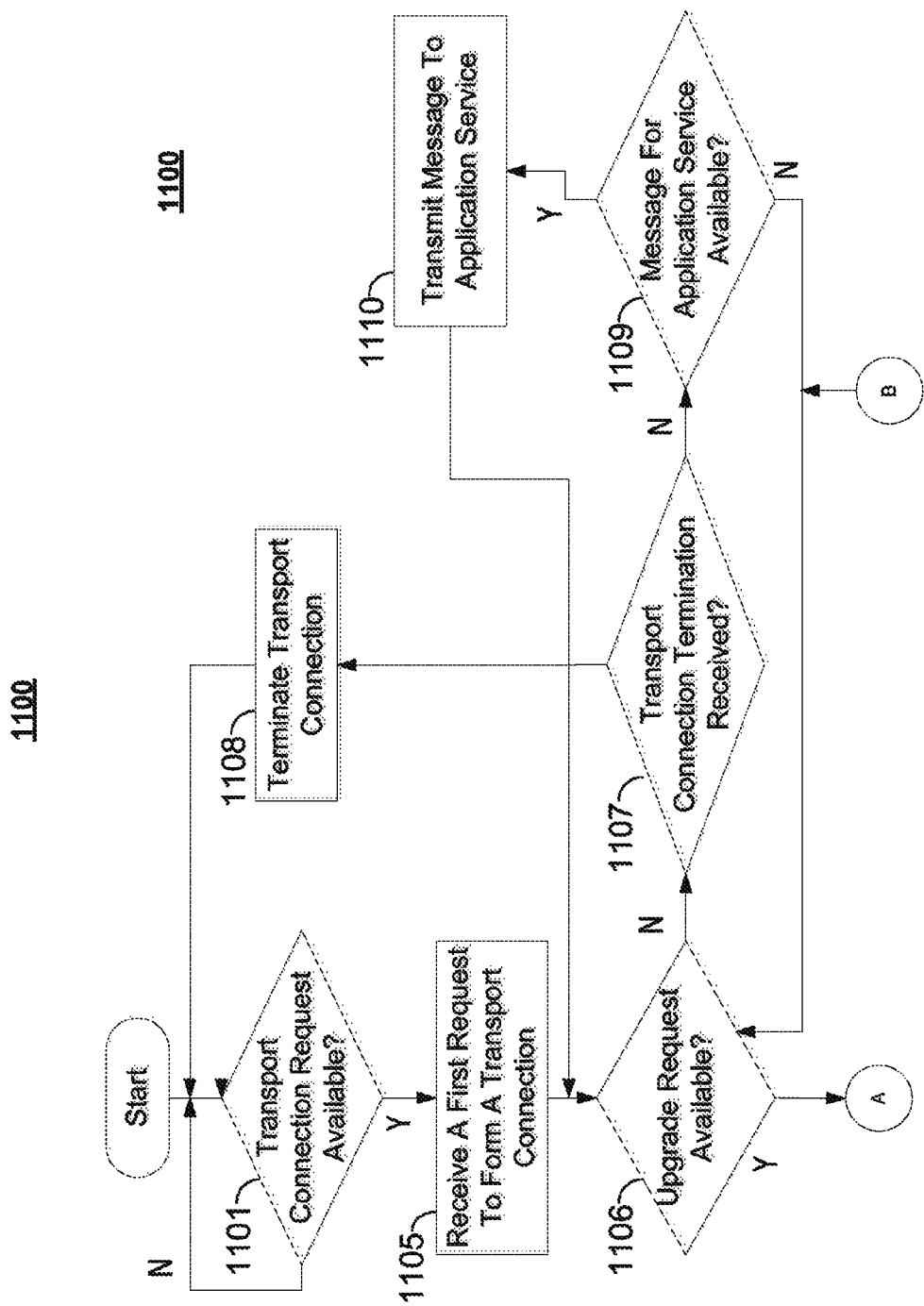
FIGS. 11A and 11B illustrate a flowchart of steps that may be implemented by a system communicating with web sockets, from a client device to an application at a host device, in some embodiments of the present disclosure.

FIG. 11A and FIG. B illustrate a flowchart of steps 1100 that may be implemented by a system communicating with web sockets in some embodiments of the present disclosure. At step 1101, control circuitry 304 of a host device 905 determines whether a first message, such as a transport connection request message to establish a transport connection, is available from a first device. Control circuitry may make this determination based on a polling mechanism or an interrupt mechanism. If a first message is available, the process proceeds to step 1105. Otherwise, the process loops on step 1101.

At step 1105, the message is received from the first device to establish a transport connection. For example, control circuitry 304 of a host device 905 receives a SYN request message from a client device 901 to set up a TCP transport connection.

At step 1106, control circuitry determines whether a second message, such as an upgrade request message, is available from the first device to upgrade the transport connection. If the second message is available, the process proceeds to step 1115. Otherwise, the process proceeds to step 1107.

At step 1107, control circuitry determines whether a transport termination request message has been received. If the transport termination request message has been received, the process proceeds to step 1108. Otherwise, the process proceeds to step 1109. At step 1108, control circuitry terminates the transport connection created in step 1101. For example, control circuitry of host device 905 terminates the TCP transport connection by sending a FIN message to client device 901.

At step 1109, control circuitry determines whether a message for transmission to an application service has been received from a first device. In response to determining that a message to an application service has been received, the process proceeds to step 1110. Otherwise the process returns to step 1106. At step 1110, control circuitry of the host device transmits the received message to the application service. The process then returns to step 1106.

At step 1115, the second message is received from the first device to upgrade the transport connection. For example, control circuitry 304 of the host device 905 receives an HTTP upgrade request message from the client device 901. The control circuitry may also process the HTTP upgrade request to determine whether the client device 901 is requesting to connect to a particular application or service.

At step 1125, an identification code of the first device and web socket connection and an application service is stored in a routing table. For example, in response to processing the HTTP upgrade request, control circuitry 304 may determine that client device 901 is requesting to connect to application 946. Control circuitry 304 may store the application name and process ID corresponding to application 946, the client ID and client port corresponding to client 901, the local port number, and the web socket number in routing table 1000.

At step 1126, control circuitry determines whether a web socket termination message has been received from the first device. For example, control circuitry of the host device 905 may receive an HTTP request from the client device 901 to close the web socket connection. In response to receiving the web socket termination message, the process proceeds to step 1127. Otherwise the process proceeds to step 1132.

At step 1127, control circuitry deletes, from the routing table, the entry for the web socket connection. Control circuitry sends a message to the client device confirming the termination of the web socket. Control circuitry may also terminate the underlying TCP transport connection. For example, control circuitry of the host device 905 may send a web socket close frame to the client device 901 to close the web socket connection, and subsequently transmit a TCP FIN message to the client device to close the underlying TCP transport connection. The process next proceeds to step 1128.

At step 1128, control circuitry determines whether there are any other web sockets in the routing table. For example, control circuitry may determine whether the routing table is empty by querying the routing table for the number of entries. In response to determining that the routing table is not empty, the process returns to step 1126. Otherwise, the process returns to step 1101.

At step 1132, the control circuitry determines whether a message is available from the first device for transmission to an application service. In response to determining that a message is available, the process proceeds to step 1135. Otherwise, the process returns to step 1126.

At step 1135, the message is received from the first device for transmission to the application service. For example, control circuitry of the host device 905 receives a message from client device 901 for the application 946. The process next proceeds to step 1136.

At step 1136, control circuitry determines whether there is a web socket connection corresponding to the first device and a targeted application service that is determined from the received message. For example, control circuitry of the host device 905 may issue a query to the routing table to determine whether there is a web socket connection corresponding to the identification code of the client device and to the application service to which the message is to be transmitted. The process next proceeds to step 1138.

At step 1138, control circuitry determines whether a web socket connection match has been found. For example, control circuitry of the host device 905 may determine whether there is a web socket connection that corresponds to the identification code of the client device and to the application service to which the message is to be transmitted. In response to determining that there is no match, the process proceeds to step 1139. Otherwise, the process proceeds to step 1140. At step 1139, control circuitry indicates an error message that there is no web socket connection corresponding to the message. For example, control circuitry of the host device 905 may display an error message to a display device indicating that there is no matching web socket. For example, control circuitry of the host device 905 may transmit a message to the client device 901 indicating that there is no web socket connection corresponding to the application service.

At step 1140, a web socket connection associated with the first device and application service is retrieved from the routing table. For example, control circuitry of the host device 905 may compare a client ID or identification code of the client device 901 and an application name of the application service with entries in the routing table 1000. The process proceeds to step 1155.

At step 1155, the message received from the first device is transmitted to the application service using the retrieved web socket. For example, control circuitry of the host device 905 may transmit the message received from the application service to the client device 901.

Figure 11B:
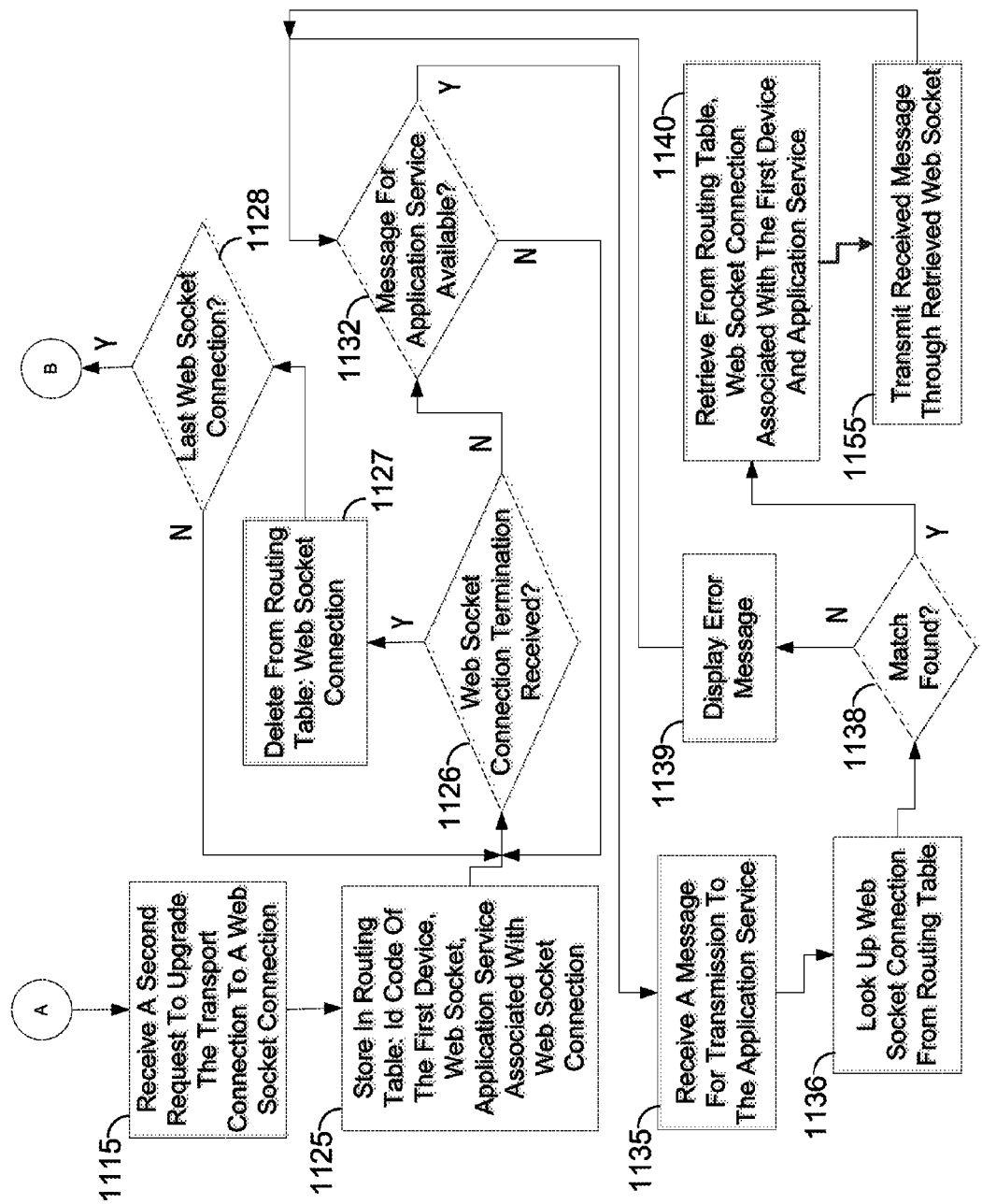

It should be understood that the above steps of FIGS. 11A and 11B may be executed or performed in any order or sequence not limited to the order and sequence shown and described in the figure. Also, some of the above steps of FIGS. 11A and 11B may be executed or performed substantially simultaneously where appropriate or in parallel to reduce latency and processing times.

The foregoing is merely illustrative of the principles of the systems and methods described herein, and various modifications can be made by those skilled in the art without departing from the scope and spirit of the systems and methods described herein. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. The above described embodiments are presented for purposes of illustration and not of limitation, and the systems and methods described herein are limited only by the claims which follow.

What is claimed is:

1. A method for connecting a first device over a communication network to an application service through a second device, comprising:
   receiving, via the communication network, a first message from the first device to form a web socket connection, wherein the first message includes an identification code of the first device;
   storing, in a routing table, the identification code of the first device received in the first message and an identification code of the web socket connection, wherein the routing table includes one or more application services associated with the web socket connection, and wherein each application service associated with the web socket connection is implemented in a layer in a protocol stack comprising a plurality of layers, wherein the layer is below an application layer and above a network layer;
   receiving, via the communication network, a second message from the first device for transmission to the application service;
   retrieving from the routing table, based on the identification code of the first device received in the second message and another identification code stored in the routing table, the web socket connection associated with the first device and the application service; and
   transmitting the received second message from the first device to the application service through the web socket connection.

2. The method of claim 1 wherein:
   the first message is an upgrade request message to upgrade a transport connection to a web socket connection.

3. The method of claim 2 wherein the upgrade request message is a point-topoint message, comprising the identification code of the first device as a source address and an identification code of the second device as a destination address.

4. The method of claim 2 wherein the upgrade request message is a broadcast message, comprising the identification code of the first device as a source address and a broadcast address as a destination address.

5. The method of claim 1 further comprising:
   receiving a third message from the first device through the web socket connection for transmission to the application service, without providing an indication message to an application implemented in the application layer above the layer in which the application service is implemented in the protocol stack.

6. The method of claim 1, further comprising:
   forming a second web socket connection to a third device, wherein the second web socket connection is associated with the application service;
   storing, in the routing table, an identification code of the third device and an identification code of the second web socket connection, wherein the routing table includes one or more application services associated with the second web socket connection;
   receiving a third message from the application service for transmission to the third device;

retrieving, from the routing table, the second web socket connection associated with the third device and the application service; and transmitting the received third message from the application service to the third device through the second web socket connection.

7. The method of claim 1 wherein the application service is a routing service for forwarding the received second message to a second application service implemented on a third device separate from the first device and the second device.

8. The method of claim 1 wherein:
the second device is a server device, and
the application service is maintained on the server device.

9. The method of claim 1, further comprising:
forming a second web socket connection with a cloud service; and
transmitting a third message from the application service to the cloud service through the second web socket connection.

10. A system for connecting a first device over a communication network to an application service through a second device, comprising:
processing circuitry configured to:
receive, via the communication network, a first message from the first device to form a web socket connection, wherein the first message includes an identification code of the first device;
store in memory, in a routing table, the identification code of the first device received in the first message and an identification code of the web socket connection, wherein the routing table includes one or more application services associated with the web socket connection, and wherein each application service associated with the web socket connection is implemented in a layer in a protocol stack comprising a plurality of layers, wherein the layer is below an application layer and above a network layer;
receive, via the communication network, a second message from the first device for transmission to the application service;
retrieve from the routing table, based on the identification code of the first device received in the second message and another identification code stored in the routing table, the web socket connection associated with the first device and the application service; and
transmit the received second message from the first device to the application service through the web socket connection.

11. The system of claim 10 wherein:
the first message is an upgrade request message to upgrade a transport connection to a web socket connection.

12. The system of claim 11 wherein the upgrade request message is a point-topoint message, comprising the identification code of the first device as a source address and an identification code of the second device as a destination address.

13. The system of claim 11 wherein the upgrade request message is a broadcast message, comprising the identification code of the first device as a source address and a broadcast address as a destination address.

14. The system of claim 10 wherein the processing circuitry is further configured to:
receive a third message from the first device through the web socket connection for transmission to the application service, without providing an indication message to an application implemented in the application layer above the layer in which the application service is implemented in the protocol stack.

15. The system of claim 10 wherein the processing circuitry is further configured to:
form a second web socket connection to a third device, wherein the second web socket connection is associated with the application service;
store, in the routing table, an identification code of the third device and an identification code of the second web socket connection, wherein the routing table includes one or more application services associated with the second web socket connection;
receive a third message from the application service for transmission to the third device;
retrieve, from the routing table, the second web socket connection associated with the third device and the application service; and
transmit the received third message from the application service to the third device through the second web socket connection.

16. The system of claim 10 wherein the application service is a routing service for forwarding the received second message to a second application service implemented on a third device separate from the first device and the second device.

17. The system of claim 10 wherein:
the second device is a server device, and
the application service is maintained on the server device.

18. The system of claim 10, wherein the processing circuitry is further configured to:
form a second web socket connection with a cloud service; and
transmit a third message from the application service to the cloud service through the second web socket connection.

* * * * *

UNITED STATES PATENT AND TRADEMARK OFFICE
CERTIFICATE OF CORRECTION

PATENT NO. : 9,253,262 B2  
APPLICATION NO. : 13/749501  
DATED : February 2, 2016  
INVENTOR(S) : Zhang et al.

Page 1 of 1

It is certified that error appears in the above-identified patent and that said Letters Patent is hereby corrected as shown below:

In the Claims:

At column 28, claim number 3, line number 42, please change "point-topoint" to -- point-to-point --

At column 30, claim number 12, line number 2, please change "point-topoint" to -- point-to-point --

Signed and Sealed this  
Third Day of May, 2016

Michelle K. Lee  
*Director of the United States Patent and Trademark Office*